Patented Aug. 22, 1933

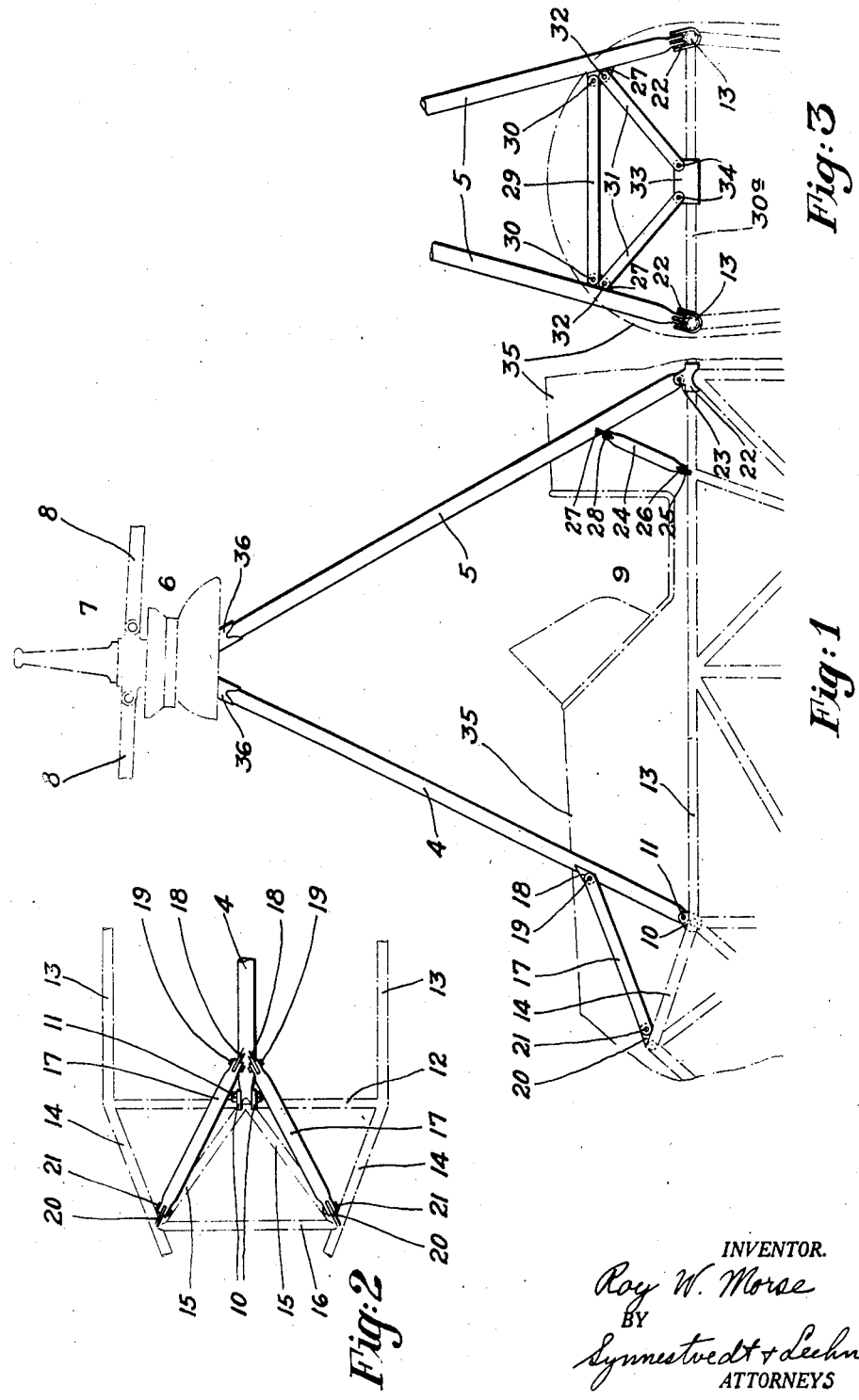

1,923,110

UNITED STATES PATENT OFFICE 1,923,110

SUPPORTING MEANS FOR AIRCRAFT SUSTAINING ROTORS

Roy W. Morse, Willow Grove, Pa., assignor to Autogiro Company of America, Philadelphia, Pa., a Corporation of Delaware Application May 9, 1931. Serial No. 536,189

9 Claims. (Cl. 244—19)

This invention relates to supporting means for aircraft sustaining rotors and is especially concerned with the type of craft in which the sustaining rotor includes a plurality of sustaining blades mounted for common rotation about a substantially vertically extended axis and also for individual movements, preferably, within as well as transversely of their general path of rotative travel.

Generally considered, the invention herein disclosed has in view a supporting or mounting structure which is not only of adequate strength to take care of all the various loads and stresses to which it is subjected but which, in addition, is arranged to resist bending and/or twisting of various of the supporting or mounting elements.

Still further, the present invention has in view certain improvements over the structure of my copending application, Serial No. 529,075, filed April 10th, 1931. Among such improvements might be mentioned provision for removal and replacement of the supporting or "pylon" structure, as a unit, without disturbing various leg members of the structure which are normally secured to each other, in an angular relationship.

The invention also contemplates attaining various advantages more fully set forth in the above noted copending application by the use of relatively few and yet strong and rigid bracing elements and the like.

How the foregoing together with other objects and advantages which will occur to those skilled in the art are obtained will be more apparent from a consideration of the following description taken with the accompanying drawing, in which Figure 1 is a side view of a supporting pylon structure embodying features of the present invention, the view including a somewhat diagrammatic showing of fuselage or body members and the sustaining rotor hub or axis mechanism;

Figure 2 is a top view of a portion of the structure illustrated in Figure 1; and Figure 3 is a rear view of other portions of the structure of Figure 1.

To make particular reference to the various figures, attention is first called to the fact that the supporting structure herein disclosed includes a plurality of post or leg members 4 and 5—5 which converge upwardly to be secured together by means of an apex structure indicated in general by the reference numeral 6.

This apex structure is arranged to support the hub mechanism indicated generally at 7 to which the sustaining blades 8 are secured as by means of suitable articulated joints providing for individual blade movements referred to above.

The mounting or pylon here illustrated includes three supporting posts, one of which (4) is arranged to extend upwardly from the fuselage of the craft preferably intermediate the sides thereof and in front of a cockpit diagrammatically indicated at 9. On the other hand, the pair of legs 5—5 extend upwardly and forwardly from points behind the cockpit 9, at opposite sides of the body or fuselage.

As brought out more clearly in my copending application above referred to, it is desirable to brace or fix an extended section of each one of the leg members, preferably at both the upper and lower ends thereof, in order to prevent longitudinal flexure of the legs, particularly when they are subjected to compression and torsional strains such as those which result from initiation of rotation of the sustaining rotor as by means of a mechanical rotor starter. According to the present invention this fixation of the leg or post members in sections at the lower ends thereof, is accomplished by means of mounting and/or bracing elements which are secured to the leg members at a plurality of spaced points.

By reference to Figures 1 and 2, it will be seen that the bracing and mounting parts for the front leg 4 include apertured attachment ears 10 adapted to receive a pin or bolt 11 which passes through a suitable aperture formed at the lower end of this leg. The ears 10, in the preferred arrangement, are secured, as by welding, to a fuselage cross member 12 which is extended between the upper fuselage longerons 13. As best seen in Figure 2, the cross member 12 is braced to other fuselage elements 14 by means of diagonal or triangulated braces 15, the latter being interconnected at their ends remote from the ears 10 by means of an additional cross member 16. The diagonal braces 17 are extended upwardly and rearwardly from the fuselage parts 14 to be connected with the leg 4 at a point spaced substantially from the connection pin 11. The elements 17 are secured to the leg 4 as by means of lugs 18 and connection pins 19, while at their outer ends, these braces 17 are provided with attachment ears and pins 20 and 21, respectively.

Turning now to Figure 3 in which the rear legs 5—5 are illustrated, it will be seen that at their lower ends these legs are attached to the upper fuselage longerons 13 by the apertured lugs 22 and connection pins 23. The means of fixing the lower ends of these posts, as here shown, includes braces 24 extended forwardly and downwardly, to the fuselage longerons, from points on the legs 5 spaced substantially from the lower ends thereof. The elements 24 are secured to the fuselage longerons as by means of apertured ears and connecting pins 25 and 26 similar to those already referred to and, in connecting these braces to the pylon legs, I prefer to employ plate-like lugs or brackets 27 which are permanently attached to the legs themselves. The attachment of each member 24 to its associated bracket 27 is also effected by means of a removable pin 28.

Additionally, the brackets 27 are extended somewhat around the leg members 5 in order to serve as a means for attaching a leg interbracing element 29, connecting pins 30 also being employed for this purpose. Still further, the posts 5 may be diagonally braced to a fuselage cross member 30a by means of parts 31 which are attached to the brackets 27 intermediate the pins 28 and 30 by additional pins or bolts 32. The lower ends of the braces 31 may suitably be extended toward each other to be connected with the fuselage cross member 30a by parts 33 and 34.

In accordance with the preferred embodiment herein disclosed, the various bracing or "fixing" parts are all positioned within the overall dimensions of the fuselage fairing, this fairing being diagrammatically indicated in Figures 2 and 3 at 35.

The apex structure 6 which is arranged to interconnect the leg members at their upper ends preferably includes means for fixing each individual leg over an extended section thereof, this means as here shown comprising socket members 36 which are interconnected in the apex structure.

In considering the mounting structure herein disclosed it should be noted that the various attaching ears or lugs for each leg are arranged in planes which are angled with respect to each other. This arrangement, while utilizing relatively few and simple parts, at the same time, affords very good "fixation" to resist torsional and longitudinal bending forces, particularly the latter.

The present invention, therefore, provides various of the advantages set forth above as well as in the copending application above referred to by means of a structure which has the additional advantage of being readily removable and replaceable as a unit and without disturbing the normal angular relation of the posts in the apex structure 6, this feature being advantageous from the standpoint of construction, assembly or repair. The manner in which the removal is accomplished, includes displacement of the various connecting pins or bolts for the bracing elements and the post ends and then bodily raising the entire pylon structure away from the fuselage. It is preferable, of course, to withdraw or remove the connecting pins for the bracing elements which are adjacent to the legs themselves in order that such bracing elements will not be carried by or removed with the pylon.

Attention is called to the fact that the general form of "tripod-like pylon" with which the structure of the present invention is disclosed herein, is not a part of the present invention per se, but is described and claimed in the copending application of Juan de la Cierva, Serial No. 497,745, filed November 24th, 1930.

What I claim is:

1. A supporting pylon structure for an aircraft sustaining rotor, the pylon including a plurality of leg members secured together in angular relationship, said structure being associated with the body of the craft for removal and replacement as a unit, and detachable means for securing said structure to the body of the craft, said means including, for each leg member, means of connection to the fuselage secured to the legs at a plurality of spaced points on each.

2. A supporting pylon structure for an aircraft sustaining rotor, the pylon including a plurality of leg members secured together in angular relationship, said structure being associated with the body of the craft for removal and replacement as a unit, and detachable means for securing said structure to the body of the craft, said means including, for at least one leg member, a connection between the base of the leg and the fuselage and a bracing element extended from the fuselage and secured to the leg at a point spaced from its base end.

3. A supporting pylon structure for an aircraft sustaining rotor, the pylon including a plurality of leg members secured together in angular relationship, said structure being associated with the body of the craft for removal and replacement as a unit, and detachable means for securing said structure to the body of the craft, said means including, for each leg member, bracing elements connected to the leg at a plurality of spaced points with readily separable fastening means.

4. A supporting pylon structure for an aircraft sustaining rotor, the pylon including a plurality of leg members secured together in angular relationship, said structure being associated with the body of the craft for removal and replacement as a unit, and detachable means for securing said structure to the body of the craft, said means including, for at least one leg member, mounting elements connected to the leg at a plurality of spaced points.

5. A supporting pylon structure for an aircraft sustaining rotor, the pylon including a plurality of leg members secured together in angular relationship, said structure being associated with the body of the craft for removal and replacement as a unit, and detachable means for securing said structure to the body of the craft, said means including, for at least one leg member, mounting elements connected to the leg at a plurality of spaced points, said elements including connection pins at least some of which have their axes out of parallelism one to another.

6. In combination, in an aircraft having a rotary wing system, a body, a pylon for mounting the system on the body, and securing means for attachment of the pylon to the body which includes, with a pylon leg, detachable securing elements connected to said leg at points spaced-apart longitudinally of the leg.

7. In combination, in an aircraft having a rotary wing system, a body, a pylon for mounting the system on the body, and securing means for attachment of the pylon to the body which includes, with a pylon leg, detachable securing elements connected to said leg at points spaced-apart longitudinally of the leg, said pylon having a plurality of such legs arranged angularly to each other and having means adjacent their head ends for normally fixing them in such angled relation, and said detachable securing elements being positioned to permit bodily removal of the pylon without disturbing the aforesaid means of fixing the legs in angled relation.

8. For aircraft having a rotatable sustaining unit, a structure for mounting the unit above the body of the craft, said structure including a plurality of leg members extended upwardly and angularly with respect to each other, means interconnecting the leg members in their upper portions arranged to fix them in their relatively angled positions, and bracing means interconnecting the body of the craft with the leg members at a plurality of spaced points on at least one of the leg members, the bracing means being detachable without substantially altering the normal position of the leg members, whereby the mounting structure including the leg members and their said interconnecting means may be removed and replaced without disturbing the angular relation of the leg members.

9. For aircraft having a rotatable sustaining unit, a structure for mounting the unit above the body of the craft including a leg member, bracing elements attached to the leg member and to the body of the craft, the attachment to the leg member being arranged at spaced points, and attachment means providing for independent detachment of the elements extended to said spaced points, together with another leg member angularly arranged with respect to the first, and means at the head ends of the leg members normally fixing them in their angular relation, whereby the mounting structure may be applied and removed without disturbing the aforesaid means for fixing the legs in angled relation.

ROY W. MORSE.